United States Patent [19]
Eisler et al.

[11] Patent Number: 5,964,843
[45] Date of Patent: Oct. 12, 1999

[54] SYSTEM FOR ENHANCING DEVICE DRIVERS

[75] Inventors: Craig G. Eisler; G. Eric Engstrom, both of Kirkland, Wash.

[73] Assignee: Microsoft Corporation, Redmond, Wash.

[21] Appl. No.: 08/637,530

[22] Filed: Apr. 25, 1996

[51] Int. Cl.[6] .................................................. G06F 13/10
[52] U.S. Cl. .............................................................. 709/300
[58] Field of Search ............................................ 395/681

[56] References Cited

PUBLICATIONS

*Implementing Games for Windows Using the WinG API and the WaveMix DLL*, James Finnegan, Microsoft Systems Journal, pp. 61–81, Jan., 1995.
Thompson, Nigel, "Ride the WinG for Speedy Graphics", MSDN News, Microsoft Developers CD–ROM, pp(4), Sep., 1994.
Diehl, Stanford, "Windows 95 Graphics Architure", Byte Magazine, pp(4), Jun., 1995.
Finnegan, James, "Developing a Client/Server Multimedia App Using RPCs and Video for Windows 1.1", Microsoft Systems Journal, pp(29), Sep., 1995.

*Primary Examiner*—Alvin E. Oberley
*Assistant Examiner*—St. John Courtenay, III
*Attorney, Agent, or Firm*—Klarquist Sparkman Campbell Leigh & Whinston LLP

[57] ABSTRACT

A system that supports enhancement of device drivers written in distinct code sets, such as a 32-bit enhancement to a 16-bit existing driver is disclosed. The system defines a mechanism for the two device driver components to share information about their functioning, and for a device interface component to use that information so as to route calls to the device drivers based on their functional capabilities. The system can be implemented in a display device interface to support interaction between applications and video hardware components, which include enhanced device drivers.

24 Claims, 8 Drawing Sheets

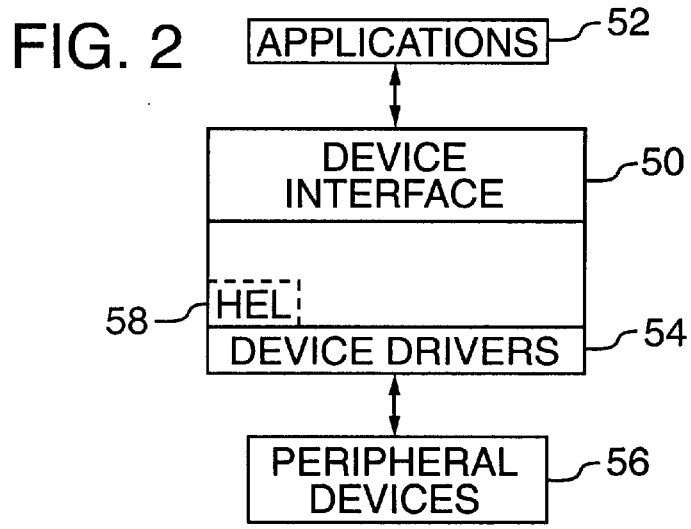
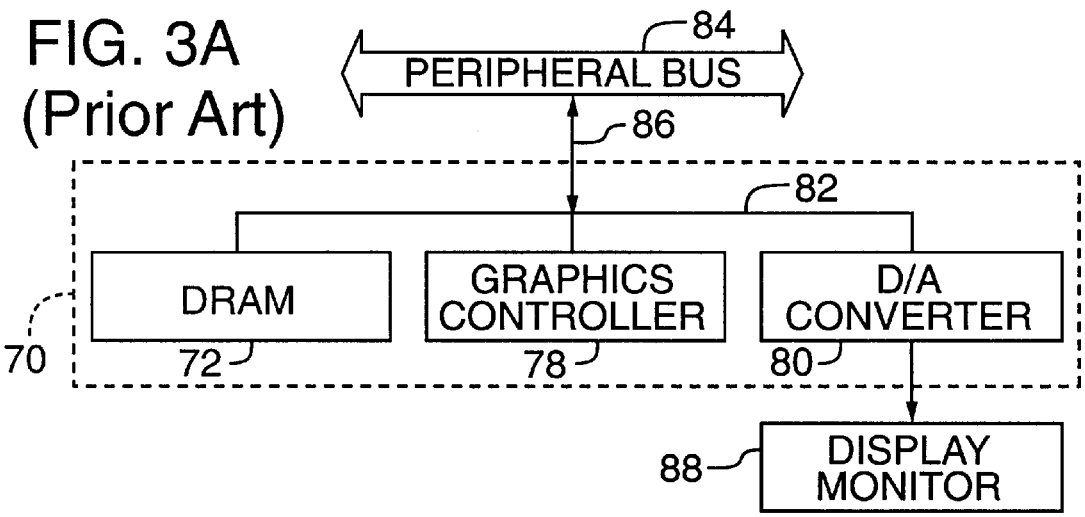
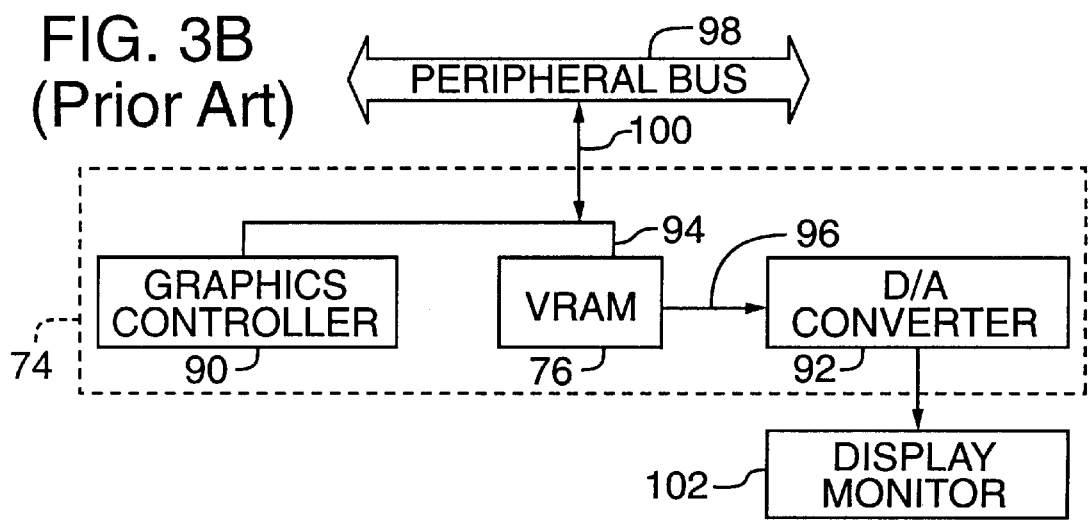

SYSTEM FOR ENHANCING DEVICE DRIVERS

RELATED CASES

This application is related to the following co-pending U.S. patent applications, which are commonly assigned:

Resource Management For Multimedia Devices In A Computer by Craig G. Eisler and G. Eric Engstrom, filed on Apr. 25, 1996 as application Ser. No. 08/637,483;

Method And System For Flipping Images In A Window Using Overlays by G. Eric Engstrom and Craig G. Eisler, filed on Apr. 25, 1996 as application Ser. No. 08/639,333, now U.S. Pat. No. 5,850,232;

Method And System In Display Device Interface For Managing Surface Memory by G. Eric Engstrom and Craig G. Eisler, filed on Apr. 25, 1996 as application Ser. No. 08/641,015, now U.S. Pat. No. 5,801,717;

Multimedia Device Interface For Retrieving And Exploiting Software And Hardware Capabilities by G. Eric Engstrom and Craig G. Eisler, filed on Apr. 25, 1996 as application Ser. No. 08/641,017;

Display Device Interface Including Support For Generalized Flipping Of Surfaces by Craig G. Eisler and G. Eric Engstrom, filed on Apr. 25, 1996 as application Ser. No. 08/641,014, now U.S. Pat. No. 5,844,569, and;

Method and System for Managing Color Specification Using Attachable Palettes and Palettes that Refer to Other Palettes by Craig G. Eisler and G. Eric Engstrom, filed on Apr. 25, 1996 as application Ser. No. 08/641,016.

These applications are hereby incorporated by reference.

TECHNICAL FIELD

The invention relates to software interfaces for enhanced devices and more specifically to a system for integrating 32-bit device driver enhancements with 16-bit device drivers in a video display system.

BACKGROUND OF THE INVENTION

The present invention has a specific application in the area of computer display systems. In part, it stems from addressing the constraints on the development of complex user interfaces within existing computer systems. When creating an application program for a computer, the design of the user interface is a major concern. In developing the user interface, the programmer typically has to include code to capture input from the user and provide output using the computer's peripheral devices. The interaction between an application and input/output peripheral devices can vary significantly depending on the type of application and sophistication of the user interface. In a spreadsheet program, for example, the application needs to be informed when the user has updated a cell in a spreadsheet so that it can update the spreadsheet and display the proper result. Since the display changes rather infrequently and does not contain complex graphics in this example, the performance of the underlying software and hardware that controls the user interface is less critical. As such, the programmer can rely on high level or generalized interfaces to peripherals without being particularly concerned with the performance of the user interface aspect of the program.

The user interfaces of many of today's multimedia applications, however, are significantly more complex and have rigorous performance requirements. Multimedia applications include, among others, games, video, and animation. In multimedia games, for example, the interaction between the application and peripherals is critical to achieving a highly interactive and realistic user interface. The interaction between the application can include not only reading input from a joystick and displaying images, but can also include mixing audio files to generate sound effects, rendering three dimensional animation using a graphics accelerator, decompressing and playing video, and updating the display image fast enough to depict realistic scenes.

To control peripheral devices in this manner, the application program can attempt to control the peripheral devices directly or can perform operations through a software interface. A software interface provides access to certain services through a specified set of operations which can be invoked by the application to request the services. For instance, an interface to sound effect services might include operations to "prepare a sound for playing," "start playing a sound," and "wait until a sound has finished playing." In response to a request for a particular service, the interface attempts to provide the service by taking steps to control the underlying hardware. In effect, the interface does what the application would have to do if it were to try to control the hardware directly. In addition to communicating with the hardware, an interface sometimes provides some resource contention management so that applications running in the computer can share access to the limited hardware resources. An interface may be developed as a device driver, e.g., the software that communicated directly with the hardware, or it may be a software component that works between the device drivers and the application.

For the vast majority of applications, application programmers rely on some form of software interface to interact with the computer's peripherals. Programmers typically rely on software interfaces to the peripherals so that they can focus on the specifics of their application rather than on the specifics of controlling a particular device. Unfortunately, many of today's software interfaces cannot provide the level of performance that multimedia applications demand.

There are a number of software products on the market today that provide interfaces between application programs and peripheral devices. These interfaces are sometimes characterized as low or high level interfaces, and device independent or dependent. A high level interface is one whose operations request big-picture strategic services, such as "start playing this sound" or "display this document." A low level interface is one whose operations request tactical services specifically, such as "tell the sound card at I/O (input/output) address 220 to point its DMA buffer to memory address 1000000" or "tell the video card to copy the 64×64 pixel region from a location starting at address 0000001 to a location starting at 1000000 in video memory." In general, a high level interface may be easier for a programmer to use, but a low level interface may provide better performance and direct access to specific functionality. Ease of use at the high comes from having fewer details to take care of, while better performance at the low level comes from taking advantage of special cases the hardware handles well.

The terms "device independent" and "device dependent" refer to the extent to which the interface is specific to a particular piece of hardware. Device independent interfaces provide operations that are not specific to a particular brand of hardware device. Instead, the operations hide the detail of the hardware from the application and take care of these details internally. Such interfaces are usually written for a certain type of device, such as video cards. In contrast, device dependent interfaces provide operations to control specific features of a particular piece of hardware. To write an application using a device dependent interface, the application developer has to have a detailed understanding of how the specific hardware operates. Such interfaces are often referred to as device drivers.

Hardware dependence is usually not favored because it is not flexible to changes in the underlying hardware and can often lead to resource contention problems. Applications written for a device dependent interface can be rendered obsolete by updates to the underlying hardware, and commonly do not work for more than one brand of peripheral.

In general, high level interfaces tend to be device independent because they hide details, whereas low level interfaces tend to be device dependent because they reveal details. For instance, "play a sound" does not rely on the details of any sound card, but "tell the sound card at IO address 220 . . . " obviously does.

While device independent, high level interfaces are generally easier to use for the reasons explained above, they typically are unable to provide the performance and functionality needed for certain types of applications. High level interfaces are often not sufficient for game applications and other multimedia applications because they are often incapable of achieving the desired performance. Games demand higher performance because they must achieve a high degree of user interactivity and visual realism. A game application typically has to collect rapidly changing user input, compute its impact on the current scene, and display the corresponding images and playback sounds with imperceptible delay.

Since many peripherals have their own computing resources, such as processors and memory, performance can be improved by off-loading some tasks to the peripheral rather than consuming the resources of the host CPU. For example, a video card may have special purpose hardware that can copy pixels much faster than the CPU. A high level interface may not take advantage of this particular feature or may include additional layers of code that consume valuable CPU cycles and time before the operation is even started on the peripheral. Thus, without a low level interface to expose these resources to the application, they are not fully exploited.

One example of an operation that is especially important in multimedia applications is the process of drawing images for display. To achieve better performance, it is often necessary to manipulate a video card directly. Video cards typically provide a write-able address register that stores a pointer to area in the video card's memory holding a screen-sized display image. In order for an application to control this register directly, the application must have specific information about the card and must keep track of the specific address location of the display image stored in the video card. In addition, the application must keep track of timing information of the display monitor so that it can properly instruct the video card to display an image at a specified location. Because of all the details that the application needs to track to control the video card, the process of generating a display image is complex and limited.

Another major constraint on the development of multimedia applications is the fact that software interfaces to the display peripherals have traditionally been written with 16-bit instruction code ("16-bit code"), which was supported by earlier 16-bit processors. Although 32-bit instruction processors, such as the 386/486/Pentium™ processor provided by Intel Corporation, have been available for several years, it is only recently that 32-bit operating systems have been widely used. Applications written to take full advantage of these processors' capabilities are written in 32-bit instruction code ("32-bit code"). Increased processing speeds are usually achieved by the 32-bit applications. However, the cost of converting applications from 16- to 32-bit can be significant, so many application programmers will not convert older programs, but will develop completely new programs with 32-bit code. Because of the prevalence of 16-bit applications, new processors generally run in both a 16-bit and 32-bit mode so that both types of applications can be supported. In order to support both types of applications, the processor, as well as the operating system controlling the processor, must take special steps to manage the interaction between the various applications.

In particular, it is common for application modules to call other applications or services to carry out specific functions. When the code sizes differ, the process of making such calls is referred to as "thunking." A brief explanation of this process is provided so that the benefits of the present invention can be better understood.

As an example, the Windows® family of operating systems from Microsoft Corporation (the assignee of the present application), include 32-bit code bases referred to as Win32s, Windows 95 and Windows NT. Each of these platforms supports 16- or 32-bit applications and multitasking systems, e.g., more than one process can be running at any given time, although they have to share certain system resources. Because 16-bit processes multitask cooperatively with respect to each other, 16-bit applications are often written with the assumption that they will not be interrupted by other processes until they explicitly yield the 16-bit scheduler. In contrast, 32-bit applications are written with the expectation that they can wait on 32-bit synchronization objects without impeding the progress of other processes. If code that is written under these different assumptions is mixed, care must be taken to avoid deadlocks or errors due to unexpected reentrancy.

Each of the Windows 32-bit platforms employs one or more thunking mechanisms. This table summarizes the thuniking mechanisms provided by the different Win32 platforms.

|  | Win32s | Windows 95 | Windows NT |
|---|---|---|---|
| Generic Thunk |  | X | X |
| Universal Thunk | X |  |  |
| Flat Thunk |  | X |  |

Generic Thunks allow a 16-bit Windows-based application to load and call a Win32-based DLL on Windows NT and Windows 95. Windows 95 also supports a thunk compiler, so a Win32-based application can load and call a 16-bit DLL. Win32s Universal Thunks allow a Win32-based application running under Win32s to load and call a 16-bit DLL. Specifically, the Flat Thunk in Windows 95 allows 16-bit code to call 32-bit code and vice-versa. A thunk compiler has to be written by the application developer to support the Flat Thunk. To use the thunk compiler, a thunk script is created, which is the function prototype with additional information about input and output variables. In addition to Flat Thunks, Windows 95 supports the Windows NT Generic Thunk mechanism. At least one modified thunking method is described in an application owned by the assignee of this case, having Ser. No. 08/338,646, entitled "Method and system for calling one of a set of routines designed for direct invocation by programs of a second type when invoked by a program of the first type."

While these system thing mechanisms are provided, there are still some difficulties to address when a call is made from a 16- to 32-bit process. While a process is executing 32-bit code, it is possible for other processes to enter 16-bit code, possibly reentering the 16-bit code that was thunked from. That is, entering a 16- to 32-bit thunk ("thunking up") releases the 16-bit subsystem for use by other processes, e.g., 32-bit processes. Thus, 16- to 32-bit thunks are not recommended if the code cannot be reentered. In addition, thunking up is not recommended inside callback functions passed to a third-party dynamic linked library, unless it is documented that the code calling the callback function is reentrant. Thus, in mixed processes, it is preferable not to make such calls simply because of the unpredictability of continued processing. In contrast, thunking down, e.g., from 32-bit to 16-bit code tends not to be problematic since 32-bit code is usually written to take advantage of system safeguards to manage this type of communication. One result of the thunking phenomenon is that it is somewhat difficult to partially modify an application or its components if the result is a mix of 16- and 32-bit code.

Display system architectures are prime examples of the evolution of 16- to 32-bit processes. Ever since the introduction of the Windows operating system, software interfaces, including specific device drivers, the graphical device interface ("GDI") and the device independent engine ("DIBengine", which was first included in Windows 95), have been written with 16-bit code. (The Windows display subsystem is described in detail in chapter 6 of *Windows 95*, by Adrian King.) However, recent versions of the main portions of the Windows operating system have been written in 32-bit code. As a result, the Windows system display requests from an application to a display device generally require a transition from 32-bit code to 16-bit code, e.g., a thunk, in order to access the device driver.

Thus, in existing computer systems, such as personal computers ("PC"), certain inefficiency in processing can be attributed to the continued use of 16-bit code, and the overhead required to process calls between 16- and 32-bit components. In addition, application programmers must deal with the potential uncertainty introduced by mixing 16- and 32-bit code applications without the use of special precautions. In the example of user interface intensive multimedia applications, certain enhanced or improved display functionality is available to the application if 32-bit code is used, but that 32-bit code must operate efficiently and safely with the existing 16-bit interfaces. The present invention is directed to improving the interaction of applications and devices that utilize a combination of 16- and 32-bit components.

SUMMARY OF THE INVENTION

The system of the present invention allows for the enhancement and integration of device driver pairs where the device drivers are written in two different code sizes, such as 16-bit and 32-bit. The system provides a mechanism for the drivers to share information about their functionality with a device interface. The device interface then uses the information to route device function calls from applications through the most appropriate device driver. The present invention thus allows device manufacturers to modify or enhance their device capability, to support that capability with efficient 32-bit device drivers, and to not have to significantly modify the existing 16-bit drivers. The system also provides a mechanism for the device drivers to report changes to the mode of operation of the device during processing, so that the device interface is processing the application calls based on the current state of the device.

In accordance with one aspect of the present invention, the system includes a method for passing functional information between the two device drivers using shared memory to store the information. Further, the information is shared between the device drivers and the device interface in a fashion that avoids thunking up and thereby is a more predictable method than might otherwise be used. In a multiprocessing system, event setting and priority threads are used to pass control of the processor to the device interface as soon as possible once the device driver information is ready. The device interface can then access the information using a downward thunk method which provides predictable processing.

In accordance with further aspects of the invention, the system includes a set of device driver enhancements combined with the device interface. The device driver enhancements may be provided by the developer of the device interface or, more likely, are provided by the vendor of the hardware device. Some cooperation between the developers of the device interface, the device drivers and the application programs is necessary to achieve the full benefits of the present invention. However, the specific activities required by the application programmer and hardware vendor are fairly minimal in comparison to the processing efficiencies that are achieved.

Finally, in accordance with still further aspects of the present invention, the system is integrated into a multimedia display subsystem. The device drivers are developed for video cards and the device interface is designed to support efficient real-time user interface processing, at least to the extent supported by the related video cards. The device interface is device independent and so can support a variety of video card systems without modification.

Further features and advantages will become apparent with reference to the following detailed description and accompanying drawings.

BRIEF DESCRIPTION OF THE DRAWINGS

FIG. 2 is a block diagram illustrating the architecture of a system in which the present invention can be implemented.

FIGS. 3A, 3B, 3C and 3D are block diagrams showing several examples of display device architectures.

DETAILED DESCRIPTION

The system of the present invention provides enhanced device drivers and a device interface for improved use of hardware peripherals. The device interface provides for direct access to 32-bit driver enhancements, and for quick response to hardware configuration changes in an efficient and safe manner. This device interface allows hardware drivers to be updated to match increased peripheral capabilities without having to significantly alter existing 16-bit code, the code related to the updated peripheral can be written in the more efficient 32-bit code. A peripheral vendor might also choose to simply update certain code from 16- to 32-bit to enhance performance. In operation, the device interface makes distinctions between those functions provided in 16- and 32-bit code, sending function calls in an efficient manner to the appropriate driver. Thus, applications working with the system get the full advantage of the available 32-bit functions without having to understand or directly manage the peripheral. In addition, device manufacturers can enhance the operation of the device and write a 32-bit device driver for that enhancement that can be readily combined with the existing 16-bit driver. The manufacture is thus not forced to rewrite the entire driver to take advantage of benefits using even limited 32-bit code.

One example in which the present invention has shown great advantage is in the area of computer games and other user interface intensive multimedia applications. Direct access to 32-bit functions allows certain game performance to be gated solely by display peripheral performance, thus providing the user with an experience commensurate with the display peripheral's capabilities. Applications run in conjunction with the present invention are able to run faster than on an unmodified display system. Specific examples of functions that can take advantage of the present invention include locking and unlocking access to video memory, flipping, blts, transparent blts, stretching, color space conversion and overlays. Any of these functions, if supported by the peripheral, can be written in 32-bit code, and utilized in combination with 16-bit existing code. Even implementing a few display functions in 32-bit code can improve display performance dramatically.

Before describing the details of the present invention, a computing environment in which the invention can be implemented is described.

Figure 1:
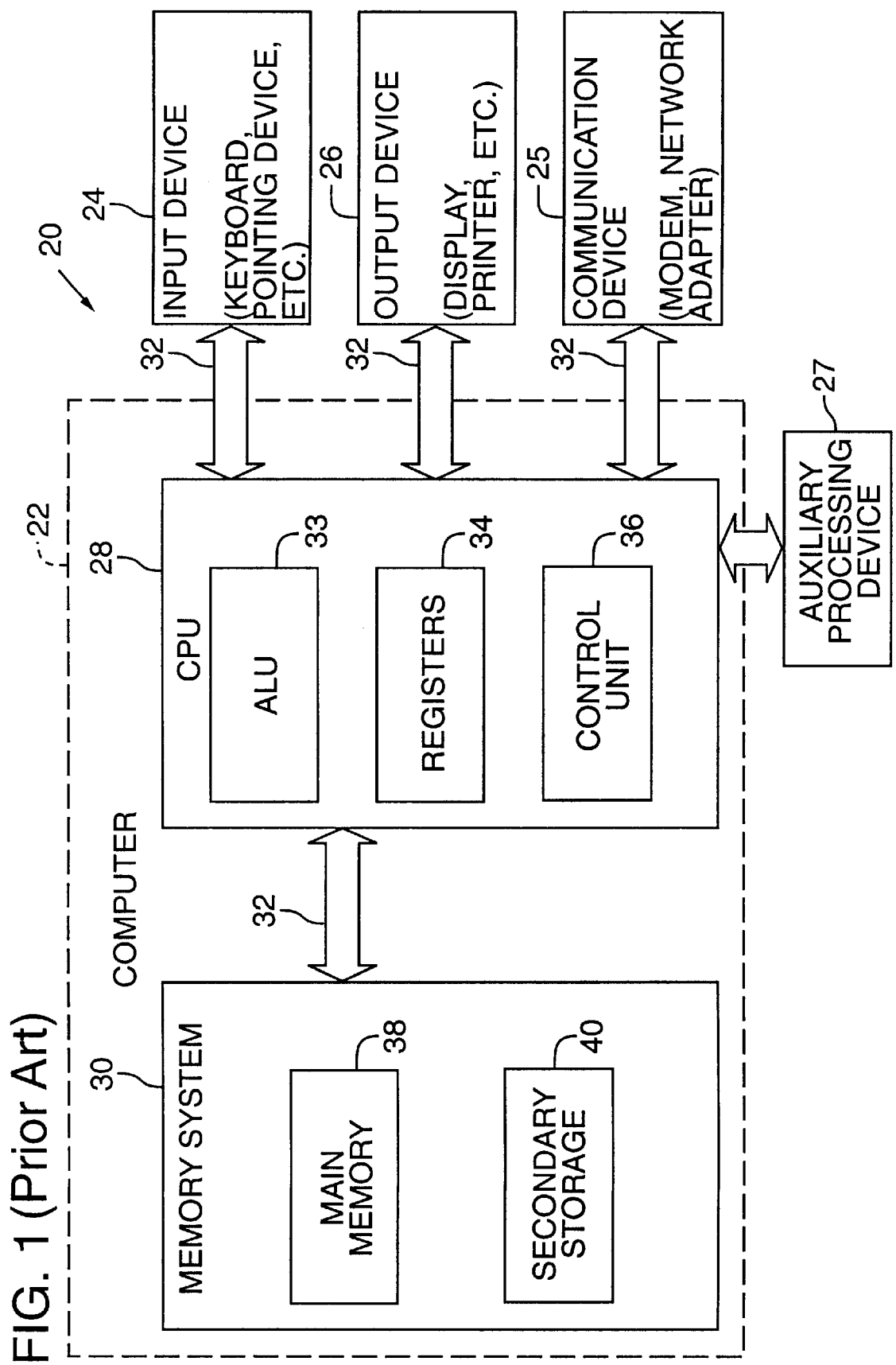
FIG. 1 is a general block diagram of a computer system 20 in which an embodiment of the invention can be implemented.

FIG. 1 is a general block diagram of a computer system 20 in which an embodiment of the invention can be implemented. The computer system 20 includes as its basic elements a computer 22, one or more input devices 24 and one or more output device 26. The computer system can also include a communication device 25 and an auxiliary processing device 27.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently-running application programs. In some implementations, main memory 38 may also include video display memory for displaying images through a display device.

Input device 24 and output device 26 are typically peripheral devices connected by bus structure 32 to computer 22. Input device 24 may be a keyboard, pointing device, pen, joystick, head tracking device or other device for providing input data to the computer.

Output device 26 may be a display device, printer, sound device or other device for providing output data from the computer.

The communication device 25 can include any of a variety of peripheral devices that enable computers to communicate. For example, the communication device can include a modem or a network adapter (25).

The auxiliary processing device 27 refers generally to a peripheral with a processor for enhancing the performance of the computer. One example of an auxiliary processing device is a graphics accelerator card.

It should be understood that FIG. 1 illustrates the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

FIG. 2 is a block diagram illustrating the architecture of a system in which the invention can be implemented. An application program ("application") 52, communicates with the device interface 50. The device interface exposes an application programming interface ("API"), which is a set of calls supported by the device interface. The device interface communicates with the device driver 54 (sometimes referred to as the hardware abstraction layer or ("HAL"). In turn, the device driver communicates with the peripheral device 56. Conceptually, in relation to FIG. 1, the applications 52 and device interface 50 reside in the memory system 30; the device driver 54 may reside in the memory system or in the hardware.

Application 52 accesses the device 56 through the device interface 50, which serves as a device-independent interface. The device interface 50 performs parameter validation, memory management, and bookkeeping for the interface. We describe specific features of the interface in further detail below.

The device driver, sometimes referred to as the hardware abstraction layer ("HAL"), 54 is a device dependent interface to the device 56. It can be an integral part of the hardware 56, or in the alternative, can be implemented in software on the host computer as noted above. In the latter case, the device driver is typically implemented as a dynamic linked library (DLL). The device driver can be developed by the manufacturer of the display card or chip, or can be developed by the operating system or other software provider. The device interface 50 can optionally include a hardware emulation layer (HEL) 58 to emulate hardware features if they are not available in the hardware.

The device 56 includes the hardware devices within and/or coupled to the host computer. In one embodiment, the device interface 50 along with the device drivers 54 shown in FIG. 2 acts as an interface to display hardware such as the video cards illustrated in FIGS. 3A–D. The device interface 50 enables applications to access video memory, including both off screen and on screen memory. It also gives the applications access to special purpose graphics hardware, where available, to enhance performance.

Figure 3C:
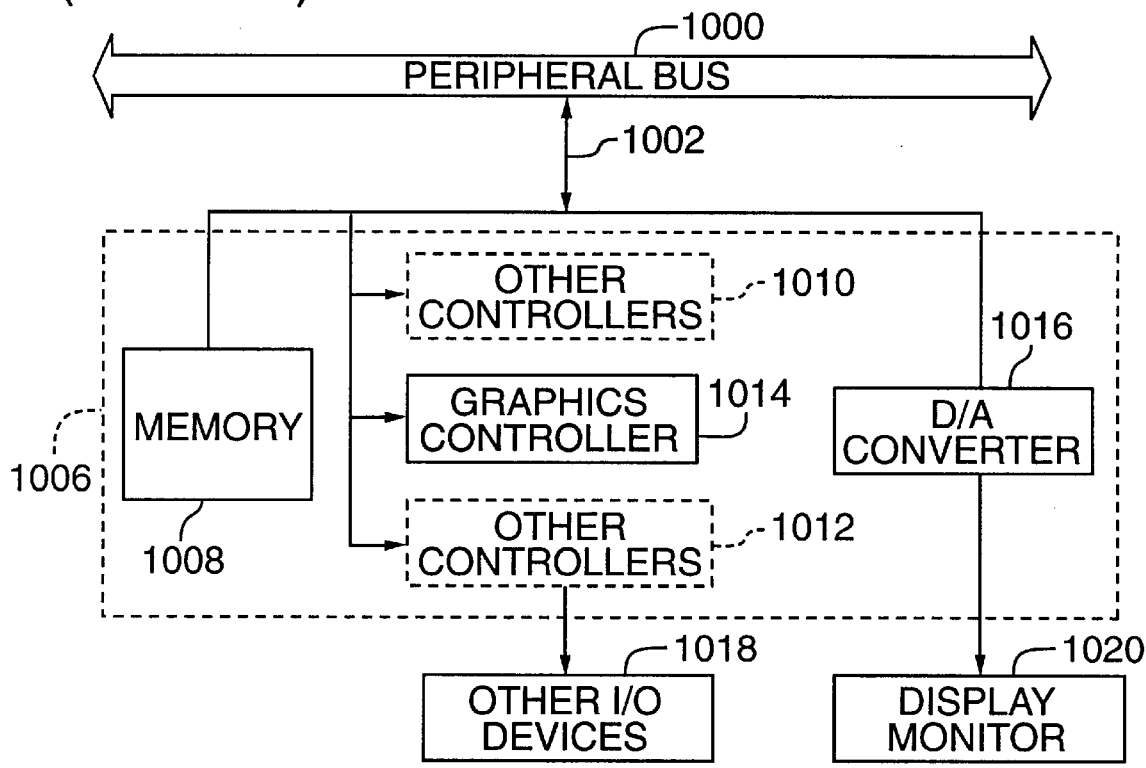
Figure 3D:
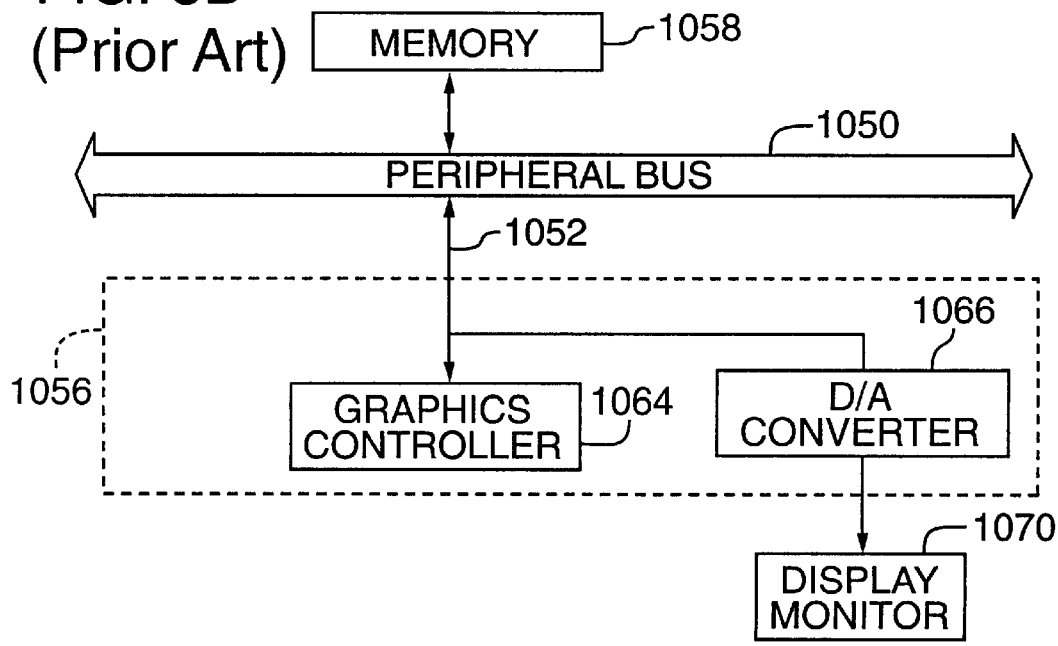

FIG. 3A illustrates the architecture of a video card 70 which includes video memory implemented with DRAM (dynamic random access memory) 72. FIG. 3B illustrates the architecture of a display card 74 which includes video memory implemented with VRAM (video random access memory) 76. The video cards shown in FIGS. 3A and 3B represent only two examples of video cards with significant on board memory in common use today. For example, there are numerous types of RAM (random access memory) used on video cards. VRAM and DRAM are just two common examples. The device interface 50, shown generally in FIG. 2, can be designed to be compatible with a wide variety of display controllers whether implemented in a video card, in a video chip in the computer, or some other configuration. FIG. 3C illustrates the architecture of a multimedia card where the memory used by the display card is shared with other accelerators. FIG. 3D illustrates the architecture of a display card where the memory used by the display card is shared with the host processor. The display device interface is intended to work across any of these architectures, combinations of them, or other architectures for storing and composing bitmaps onto a display device.

The video card in FIG. 3A includes as its basic elements a graphics controller 78, video memory 72 implemented with DRAM, and a digital-to-analog converter 80. In this type of video card, each of these elements share a common bus 82. On one side, the video card is connected to a bus 84 on the host computer via a bus interface 86. On the other side, the video card is connected to a physical display device such as a display monitor 88. To generate the video display, the video card 70 receives image data and display commands from the host computer and controls the transfer of image data to a display monitor 88. The graphics controller 78 is responsible for acceleration and other graphics operations. When the digital-to-analog converter 80 needs to take the digitally represented image data from the DRAM and send it to the monitor, the graphics controller 78 is placed on hold until the DAC 80 finishes its task.

The video card 74 in FIG. 3B includes a graphics controller 90, video memory 76 implemented with VRAM, and a DAC 92. One significant difference between the design of this card and the card in FIG. 3B is that the graphics controller 90 and DAC 92 access the VRAM 76 through separate ports (94, 96). Coupled to a peripheral bus 98 of the host computer via a bus interface 100, the video card 74 receives image data and commands from its host and controls the display of image data stored in the video memory 76. Since the VRAM is dual ported, the DAC 92 can transfer image data to the monitor 102 as the graphics controller 90 performs operations on other image data in the video memory.

The video card 1006 in FIG. 3C includes a graphics controller 1014, "video" memory 1008 (which is not specific to any particular technology used to implement the memory), and a DAC 1016. One significant difference between the design of this card and the card in FIG. 3B is that the graphics controller 1014 shares the "video" memory with other controllers 1010/1012 and the DAC 1016. There are many memory architectures for these types of cards and the device display interface supports all of them. Coupled to a peripheral bus 1000 of the host computer via a bus interface 1002, the video card 1006 receives image data and commands from its host and controls the display of image data stored in the "video" memory 1008. Arbitration between other controllers can be handled either in the HAL or by the hardware.

The video card 1056 in FIG. 3D includes a graphics controller 1064, "video" memory 1058 (which is not specific to any particular technology used to implement the memory), and a DAC 1066. One significant difference between the design of this card and the card in FIG. 3B is that the graphics controller 1064 shares the "video" memory with the host processor and the DAC 1066. There are many memory architectures for these types of cards and the device display interface supports all of them. Coupled to a peripheral bus 1050 of the host computer via a bus interface 1052, the video card 1056 receives image data and commands from its host and controls the display of the image data on the display monitor 1070. Arbitration between other peripherals on the bus can be handled either in the device drivers, by the video card 1056, by the operating system, or the bus.

Figure 4:
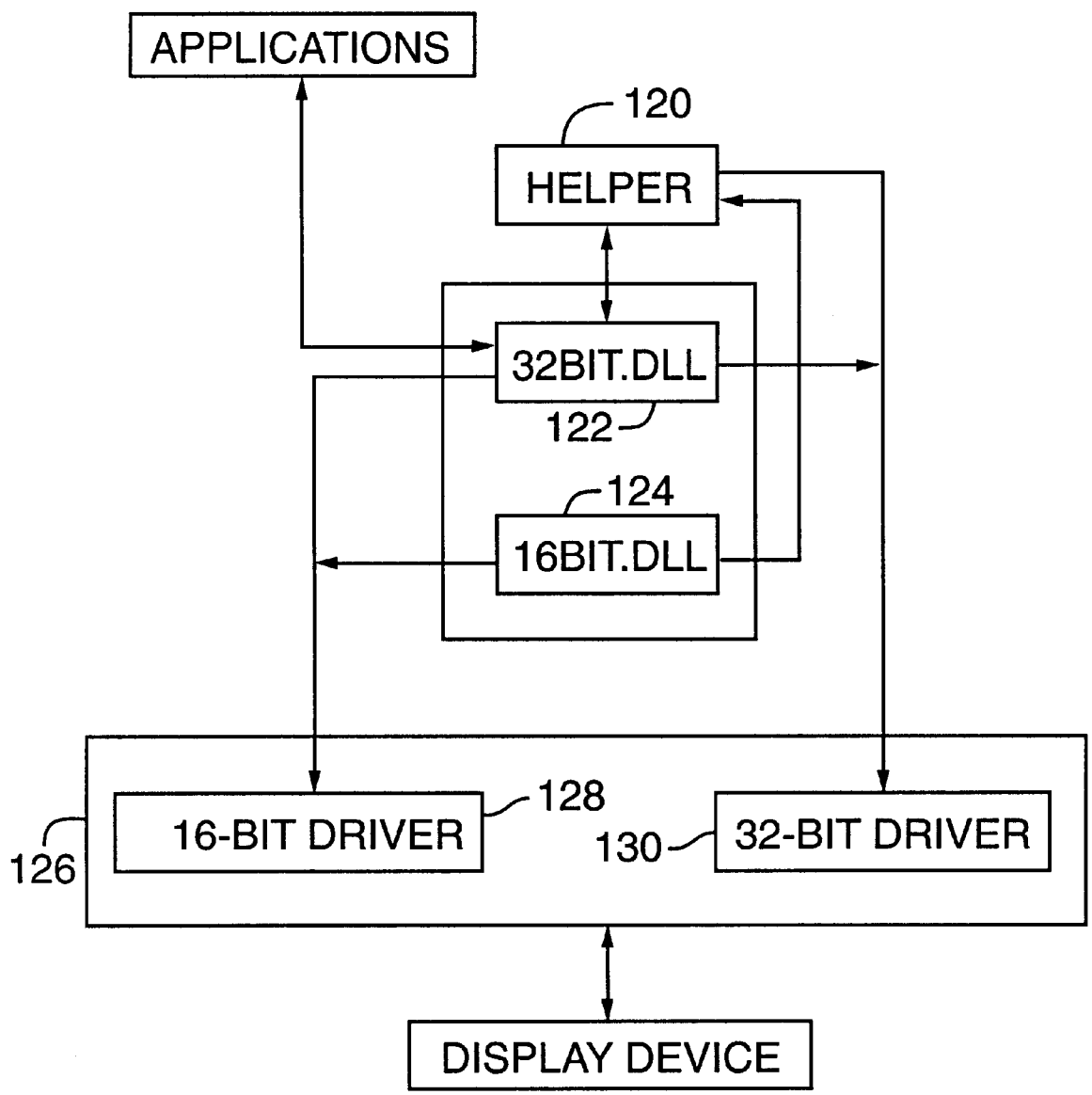
FIG. 4 is a more detailed block diagram of a system architecture including one embodiment of the invention.

With reference to FIG. 4, a more detailed diagram of the device interface includes an executable HELPER file 120, dynamic linked library 32 bit.dll 122, and dynamic linked library 16 bit.dll 124. Other components and functions may also be included in the device interface to provide additional support to the application or hardware processing. HELPER holds the execution context for the DLLs, which, in turn, manage access to the device drivers.

The device driver 126 is made up of 16-bit device driver 128, and 32-bit device driver 130. The system of the present invention includes some portion of both the 16- and 32-bit drivers. Specifically, the drivers must be able to communicate certain information to the device interface regarding their capabilities. However, beyond that, little modification is required of existing drivers. The 16-bit driver is loaded prior to use of the corresponding device. The 32-bit driver may be loaded at that time or may be loaded when the device interface is first called or initialized. The two drivers work closely together and are likely provided as a single driver component. The drivers can be provided by the operating system vendor or other software vendor, or by the device vendor.

The system illustrated in FIG. 4 is the system as it would be after initialization of the device interface. Certain information about the drivers and the device are established at initialization. The passing of information is illustrated by the dashed lines. In summary, the 32-bit driver provides a list of its functions and capabilities to the 16-bit driver. In turn, the 16-bit driver adds its own functions and capabilities to the list along with specific information about the operation and characteristics of the device. The completed list, referred to as the HALInfo list, is passed to the device interface. One benefit of the present invention is related to the methods used to pass HALInfo list between the 32-bit driver, the 16-bit driver and the 32 bit.dll. As may be recalled from the earlier discussion, this type of communication normally requires "thunking" and thus may introduce uncertainty into the process. The method of the invention will be described in detail below.

Once the initialization is completed, an application, e.g., a games application written to interface with the display interface (e.g., to make calls to the display interface), can execute and control the device. As the application is making calls to the device, the 32 bit.dll uses the HALInfo list to determine which functions, of those required by the call, can be handled by the 32-bit driver. Those functions that are not supported by the 32-bit driver are passed to the 16 bit.dll, which, in turn, passes the function call on to the 16-bit driver. In this fashion, the device interface allows an application to transparently take advantage of the functionality provided in the 32-bit driver.

In some types of devices, during processing, device settings or modes will change. For example, in a display device, the mode might be changed by a user or an application; a game, a full screen DOS session, and a direct change to display settings (e.g., via the display dialogue provided by the Windows operating system control panel) can all cause changes to the display device mode. Changes might include screen resolution (e.g., 640×480 or 800×600), color (e.g., 16 bits per pixel ("bpp") for 65536 colors or 8 bpp for 256 colors), and monitor refresh rate. If such a mode change occurs during processing, it might alter the relationship between the application and the device and thus must be conveyed to the 32 bit.dll for its processing decisions. Clearly, this type of information should be updated in the HALInfo list and passed to the 32 bit.dll as soon as possible. The present invention provides a method for insuring the information is updated in a timely and safe fashion.

The present invention thus provides a system to enhance existing 16-bit driver functionality by integrating a 32-bit driver into the system. Only minor modifications need to be made to the existing 16-bit driver—it must be able to identify its associated 32-bit driver, maintain the HALInfo list, and notify the 16 bit.dll when a mode change occurs. These amount to small modifications compared to trying to handle the processing of both 16- and 32-bit drivers within the driver code itself. Further, although some applications can be completely rewritten ("ported") from 16- to 32-bit implementations, such a proposition would be difficult if not impossible in the case of a device driver that works within a 16-bit operating system or subsystem. The Windows 95 operating system's display subsystem (described in further detail below) is such a system. The device interface of the present invention overcomes this limitation in a device independent (and thus flexible) fashion. A more detailed explanation of the methods for initializing, using, and updating the system are presented immediately below for a better understanding of the invention.

Figure 5:
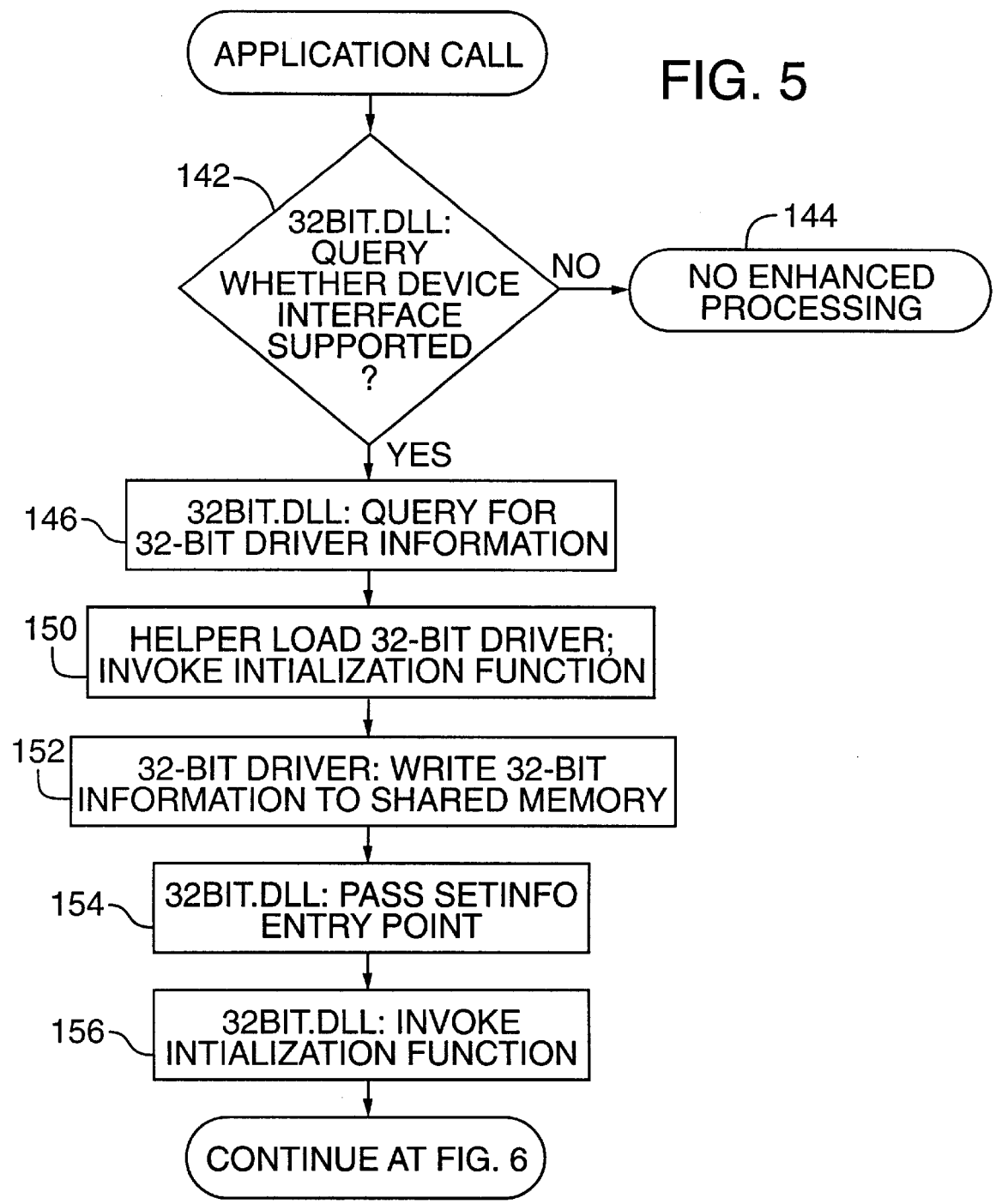
FIG. 5 is a flow chart illustrating the initialization of the system of the present invention.

With reference to FIG. 5, the device interface is initiated by a call from an application. At step 142, a query is sent to the 16-bit driver which returns an indication of whether the device interface is supported. If it is not, the device interface assumes no enhanced functionality is available and does not attempt to take advantage of any enhancements provided by the 32-bit driver.

If the device interface is supported, at step 146 a second query is made, this time to obtain information regarding the 32-bit driver. In response to this call, the 16-bit driver returns the name of its associated 32-bit driver, the name of the driver initialization function in the 32-bit driver, and a pointer to a region of shared memory. The shared memory will be used by the 32-bit and 16-bit drivers to share information to be included in the HALInfo list. This is because the components of the drivers need to share common state information, and because it is not possible for the 16-bit driver to call the 32-bit driver new state information at arbitrary points in time. A shared memory region is created for the two pieces of the driver to use to communicate. As an example of creating a shared memory area, Windows 95 would create a structure in the 16-bit driver. Since 16-bit code lives in the shared memory space, this structure could be shared with a 32-bit process.

At step 150, HELPER loads the 32-bit driver, invokes the driver initialization function, and passes in the pointers to shared memory. The driver initialization function executed by the 32-bit driver creates a 32-bit pointer from the 16-bit pointer. This pointer can be used by the 32-bit code to access the same memory that the 16-bit pointer accesses from the 16-bit side. An example of such a conversion function is MapLSFix supported by the Windows operating system.

Using the 32-bit pointer to the shared memory location, at step 152, the 32-bit driver writes the required 32-bit function and capability information into the shared memory. This information includes the address of each 32-bit function representing a driver entry point within the 32-bit driver. Additional information for the 16-bit driver, not relevant to the present invention, might also be written to the shared memory.

At step 154, the 32 bit.dll makes a third call to pass an entry point of a function, SetInfo, in the 16 bit.dll to the 16-bit driver. This entry point will later be associated with the passing of the HALInfo list from the 16-bit driver to the 16 bit.dll and the communication of this event to the 32 bit.dll.

At step 156, the 32 bit.dll makes the last call which asks the 16-bit driver to use the information in the shared memory to initialize itself for use with the device interface.

All of the steps described up to this point are carried out during initialization, e.g., the first time the device interface is used with a given device. The steps described below in conjunction with FIG. 6 both complete the initialization process and update the 32 bit.dll when a mode change occurs in the device. As noted above, one benefit of the present invention is its ability to handle real-time device mode changes in a manner that will not cause the 16-bit driver to thunk.

Figure 6:
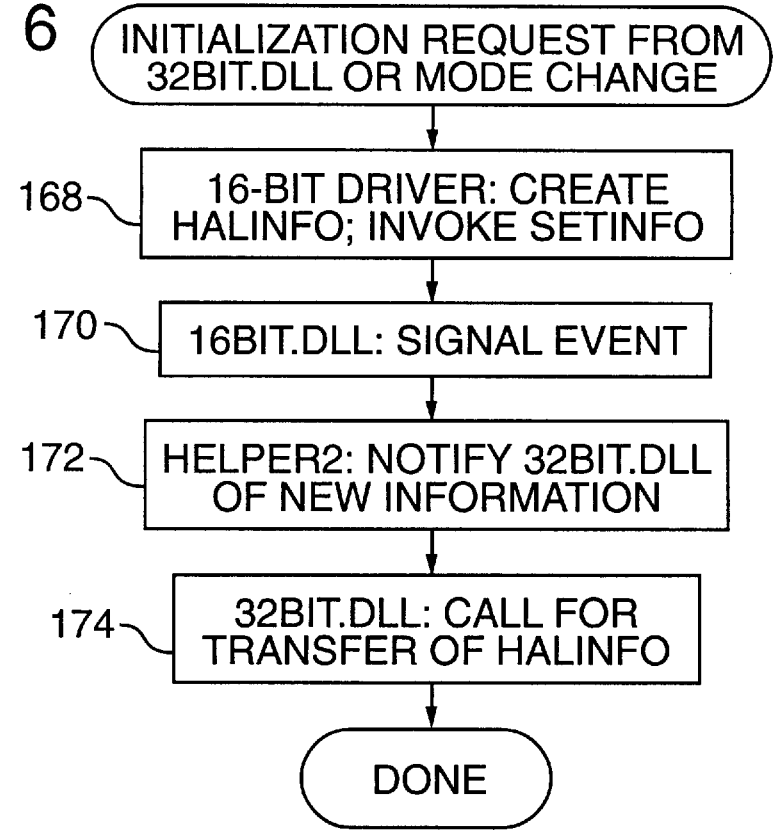
FIG. 6 is a flow chart illustrating the final initialization steps and the steps of updating a device mode within the system of the present invention.

With reference to FIG. 6, the 16-bit driver has either been invoked by the 32-bit.dll or has experienced a mode change. In both cases, the current HALInfo list must be passed to the 32 bit.dll. At step 168, the 16-bit driver retrieves the information in the shared memory location, which includes the addresses of the 32-bit functions, combines this information with information about its functions and capabilities along with the capabilities of the device to create the HALInfo list. The 16-bit driver then calls the SetInfo function in the 16 bit.dll, passing the HALInfo list.

At step 170, the 16 bit.dll will signal an event, which indicates new information is available. As soon as the current 16-bit processing is completed, the operating system scheduler will switch to scheduling 32-bit tasks; the real-time thread blocked on this event in the HELPER will be scheduled for immediate execution. This event setting allows HELPER to obtain control of the processor at the earliest available time after the 16-bit side has completed its processing. This is safe because no normal application code on the 32-bit side will get a chance to run until the real-time thread has gotten a time slice. This particular implementation assumes the operating system supports events, e.g., an application can trigger an event that will be queued and then handled by the central processor in some predetermined order. The HELPER component would have created a highest priority thread when it was initialized; this ensures control is passed from the 16-bit driver to HELPER as soon as possible. (Threads are explained in further detail near the end of the detailed description.) Once the event is triggered at step 172, HELPER notifies the 32 bit.dll that information has been established (or updated in the case of a mode reset). In response, at step 174, the 32 bit.dll calls the 16 bit.dll to have the HALInfo list transferred to the 32 bit.dll.

One key aspect of the present invention is the use of a process control mechanism, such as the event and real-time priority thread described above, to obtain access to the central processor and to send an indication to the device interface that updated information is available all within a reasonable amount of time from when the change occurred. This is done without "thunking up," e.g., trying to directly call the 32 bit.dll from the 16 bit driver. The use of the present system provides for both timely processing, because the a high priority event/thread pair is used (or some similar signaling method), and safe updating, since there is no time when the 16-bit code might simply lose control of the process, other than when it yields control itself.

Figure 7:
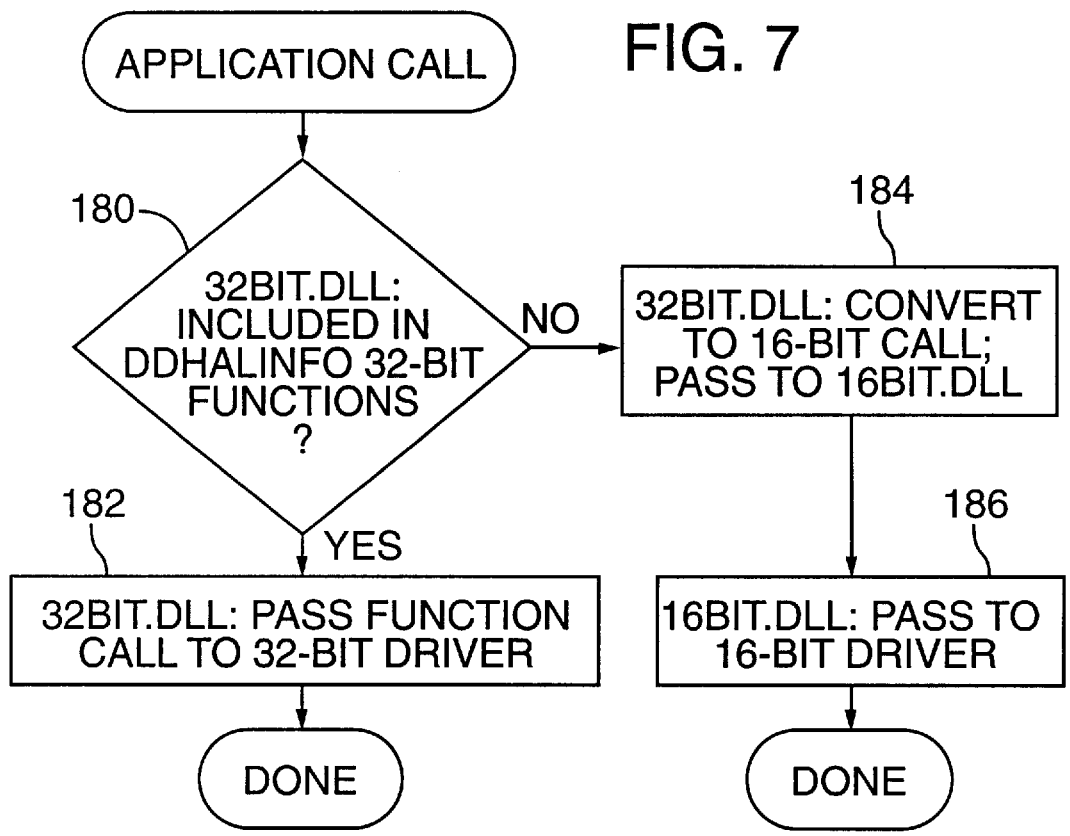
FIG. 7 is a flow chart illustrating the use of the system of the present invention to direct function calls made from an application to a hardware peripheral device.

Finally, while the initialization and updating of the device interface have been explained, the actual use of the device interface to support the operation of an application must be described. With reference to FIG. 7, an application call is received from the application by the 32 bit.dll. At step 180, the 32 bit.dll analyzes HALInfo to determine which driver functions must be called to implement the application call. In one embodiment, the function entries in HALInfo are marked with a bit to indicate which driver supports each function (e.g., a "1" indicates support on the 32-bit side and a "0" indicates support on the 16-bit side). At step 182, if a necessary function is supported by the 32-bit driver, the function call is passed directly to the 32-bit driver. At step 184, if the function is supported by the 16-bit driver, the pointers to the function must be converted to 16-bit pointers and then passed to the 16 bit.dll. At step 186, the 16 bit.dll passes the function call to the 16-bit driver for processing.

As an example of the decision making performed by the device interface, an example is presented.

The device interface obtains the capabilities of the hardware it represents from the device drivers that represents the display hardware, which is referred to as the HAL for his example. The device interface obtains its software emulation capabilities from the Hardware Emulation Layer (HEL). There can be more than one HEL and more than one HAL. In the case of multiple HALs and HELs the capabilities provided by them can be presented through the API either separately or as a composite.

The HAL obtains the capabilities of the display hardware through its intimate knowledge of the hardware it was written for. The HEL knows the software emulation it provides because the author of the HEL knows what emulation algorithms were incorporated in it, HELs are predominately implemented by the provider of the device interface.

Some hardware capabilities require software augmentation. When this type of functionality is being reported through the capabilities method (GetCaps is the device driver in one implementation) which gets the information from the HALInfo list of the display device API, the device interface reports the capability requiring software preparation as HWASSIST (hardware assist). This allows an application to know that some software preparation will be done before the hardware can be used to perform the acceleration.

In a specific example of a blter, the application calls the device interface API and asks for the hardware capabilities of the device. The device interface reports that the device can do source copy blts (one for one copies) from video memory to video memory but that it can not do transparent blts (copies that don't copy one specified color) from video memory to video memory. Video memory, in this context, refers to memory that the video display card can access with its hardware accelerators. Video memory is typically a scarce resource on current display devices, but using the display device blter to move the video memory around is also typically two or three times faster than the host processor. The application can modify its behavior with regard to the capability information returned by the device by putting all of its bitmaps (media that can be blted) that do not require transparent blting into video memory, in order of their usage priority, until the video memory is gone. If the hardware had reported that it supported transparent blting the application may have loaded bitmaps that required transparent blting into video memory, over bitmaps that do not. Transparent blting is even more costly, when done on the host than source copy blting is. For the bitmaps that do not fit in the memory that is hardware accessible, the application can ask if the device interface can perform the transparent blt operation without the hardware by emulating the feature in software. If the device interface can provide software emulation, then the application has a choice whether or not to use the software emulation provided by the device interface, or use the application's own algorithms. This is a very important option for real time applications and games. Blting is just one example of display functionality that may be provided by a display device to a host PC, other examples include overlays, 3D rasterization acceleration, decompression, etc.

As can be appreciated from the foregoing discussion, the invention can be used to allow 32-bit enhancements to existing 16-bit device drivers with minor modifications to the 16-bit drivers. In use, the system automatically allocates function calls to the 32-bit or 16-bit driver, whichever is most appropriate. The system could be implemented with a variety of types of devices and would be helpful so long as there is a benefit to be gained from the use of an enhanced 32-bit driver. In addition, the device interface is device independent and so can be used, for a variety of devices of the same type, e.g., display devices from different manufacturers. One actual embodiment of the present invention has been developed for a display device interface used within a display system. One implementation of the invention is embodied in the DirectDraw architecture provided by the assignee of this application. The components and methods of this system are described in detail below.

Figure 8:
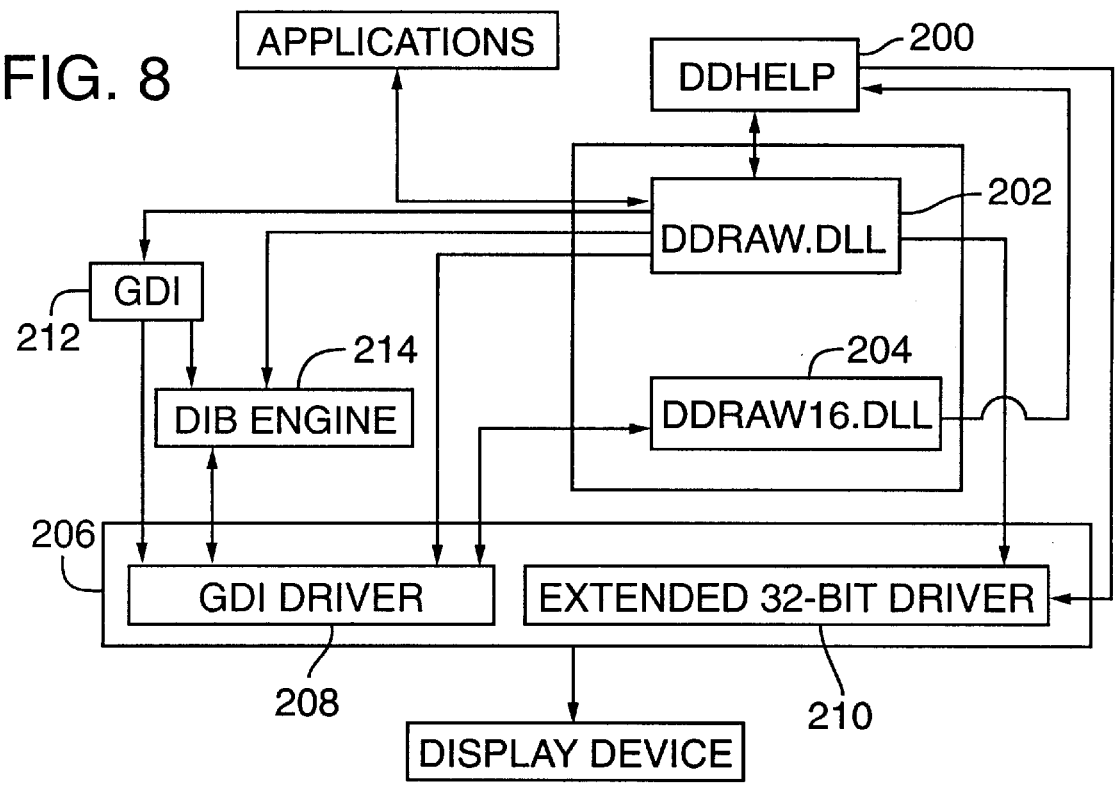
FIG. 8 is a block diagram of a display device system in accordance with the present invention that might be used with multimedia applications.

FIG. 8 illustrates an embodiment of the present invention as it might be used in a Windows 95 operating system environment, which includes a number of 16-bit display components. The main components of the display device interface are DDHelp 200, DDraw.dll 202 and DDraw16.dll 204. The device driver 206, includes modified GDI driver 208 (also known as the Windows 95 mini driver) and an enhanced 32-bit driver 210. Other key components of the subsystem are the GDI 212 and the DIBEngine 214. As with the other examples described above, an application makes calls to the display device interface, and those calls are processed and the necessary function requests are passed on to the display device via the driver.

As noted above, the Windows 95 display system is a good example of a system that is closely tied to 16-bit code implementations. Both the GDI and the DIBEngine are mainly 16-bit. Thunking from 16- to 32-bits in a GDI device driver requires the driver to be reentrant, but GDI device drivers are not typically reentrant. Also, a GDI device driver may only thunk using the following control display driver interface (DDI) functions: Control(ABORTDOC); Control (ENDDOC); Control(NEWFRAME); Control (NEXTBAND); and Control(STARTDOC). A GDI driver cannot arbitrarily thunk to 32-bit code, but would require a 32-bit application to thunk to the 16-bit side to execute the 32-bit components. (Certain 32-bit components exist within the Windows 95 display subsystem but are not illustrated or discussed here as they are not believed to be related to the present invention.).

Without the display device interface in place, an application would access the display device (video card) through GDI and the GDI driver. GDI makes all of its calls to the GDI driver unless it receives a flag which specifically sends it to the DIB engine first. The GDI driver calls the DIB engine for requests that it cannot handle. (As noted above, the Windows 95 display subsystem is described in further detail at chapter 6 of King, *Windows 95*.) When the device interface of the present invention is in place, it accesses the device directly through the 16- or 32-bit device drivers, also known as the hardware abstraction layer ("HAL"). Unlike GDI with the GDI driver, the device interface understands the capabilities of the hardware underlying the device drivers. It calls the device drivers directly for supported functions or calls the hardware emulation layer (HEL) for functions which must be software emulated.

At initialization and during mode changes, the device interface utilizes the GDI driver to get information about the available driver functions and their addresses; the capabilities of the card and driver such as stretching, transparent blts; and other information such as display pitch. All of this information is collected in a data structure, the DDHALInfo. Once the device interface has this information, it can make use of the 32-bit driver to access the card directly, without going through GDI or the GDI driver. The device interface still uses the GDI driver for emulation of functions like stretching and blting between surfaces with different pixel formats and mode changes.

Although in the Windows operating system example, the GDI, which is the existing display interface, is very fast at drawing spreadsheets, graphs and doing TrueType font expansions, etc., it is not optimal for supporting the real-time processing demands of popular multimedia applications. The present invention can be used to augment GDI in his regard by handling the device-dependent hardware accelerator functions in a 32-bit hardware abstraction layer. The user interface displayed by games and other multimedia applications can be greatly enhanced using the system of the present invention. The details of initialization and use of the display device system are described in detail below.

Figure 9:
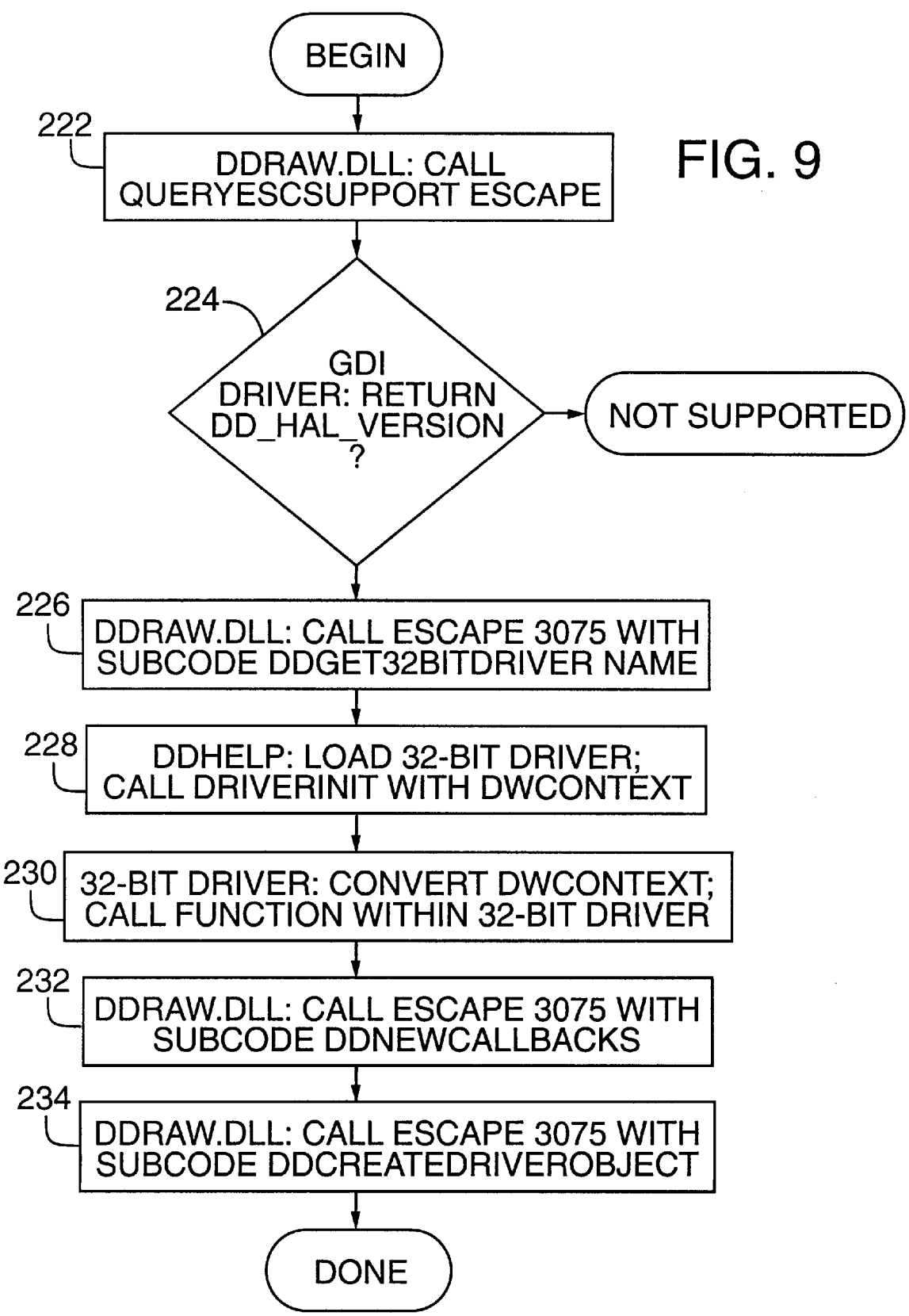
FIG. 9 is a flow chart illustrating the initialization of the system shown in FIG. 8.

With reference to FIG. 9 at step 222, the driver initialization begins with an escape being sent from the DDraw.dll to the 16-bit GDI driver, specifically the QueryEscSupport escape for escape 3075. Escape calls, which each include a number parameter, are calls supported by the hardware vendor through an industry standard mechanism for adding 16-bit functionality to drivers and to allow software to communicate directly with this additional functionality in the device driver. For example, if a hardware vendor agrees to support escape 20 for a specific reason, then the hardware vendor and software vendor who will use the call (in this case the developer of the device interface) agree on the action that will be taken when the call is made. At step 224, the GDI driver returns the DD_HAL_VERSION being supported if it supports the device interface. Otherwise, the assumption is made that extended functionality is not available.

Next, at step 226, the escape 3075 with subcode DDGET32BITDRIVERNAME is sent to the GDI driver. This returns the name of the 32-bit driver DLL [szName], the name of the entry point [szEntryPoint], and [dwContext] which is a pointer to a region of shared memory between the 16- and 32-bit address space. Once this information is known to the device interface, at step 228, DDHelp loads the 32-bit driver into shared address space, calls DriverInit [szEntryPoint] and passes [dwContext] to it. At step 230, DriverInit uses the standard Windows operating system function MapLSFix to convert the [dwContext] 16-bit pointers to 32-bit pointers and performs any device specific processing requires to fill in all of the 32-bit information in the shared memory. This information must include at least the information required by the device interface; which is the address of all of the 32-bit driver entries, but might also be used by the drivers to exchange additional information. In one embodiment, a data structure that might be used for the shared memory component is:

```
typedef struct
{
  DWORD          dwScreenFlatAddr;    // pointer to display memory
  DWORD          dwScreenWidth;       // width of display
  DWORD          dwScreenHeight;      // height of display
  DWORD          dwBpp;               // bits per pixel of display
  DDPIXELFORMAT             ddpf;     // pixel format of display
  LPDDHALSURFCB_BLT  lpBlt32;         // 32-bit Blt HAL function
  LPDDHALSURFCB_FLIP lpFlip32;        // 32-bit Flip HAL function
  LPDDHALSURFCB_LOCK lpLock32;        // 32-bit Lock HAL function
  LPDDHALSURFCB_GETBLTSTATUS lpGetBltStatus32;
     // 32-bit GetBltStatus HAL function
  LPDDHALSURFCB_GETFLIPSTATUS      lpGetFlipStatus32;
     // 32-bit GetFlipStatus HAL function
  LPDDHAL_WAITFORVERTICALBLANK lpWaitForVerticalBlank32;
     // 32-bit WaitForVerticalBlank HAL function
  LPDDHAL_GETSCANLINE       lpGetScanLine32;     // 32-bit
     GetScanLine HAL function
  DWORD  bReset;        // has the display been reset?
  DWORD  bUsingVFlatD;  // is VFlatD being used (blank switched card)
  DWORD  dwCardType;    // what kind of card is in use?
} SDATA;
```

At step 232, the subcode DDNEWCALLBACKS, is sent to the GDI driver, in which it is sent a series of entry points (functions) that it might use later. These include SetInfo, VidMemAlloc and VidMemFree. SetInfo is an entry point to a function in the DDraw16.dll. VidMemAlloc and VidMemFree are the entry points for functions within DDraw.dll. They are exported from the DDraw.dll on the 32-bit side and from the DDraw16.dll on the 16-bit side. They might be used by the 16-bit driver or the 32-bit driver to allocate or free the video memory.

The last subcode, DDCREATEDRIVEROBJECT, is sent at step 234 to the GDI driver to ask it to initialize itself. This is the same function that is used to re-initialize the system when the device mode is changed. This is the point at which initialization and re-initialization (or Enable and ReEnable of the display driver) merge.

Figure 10:
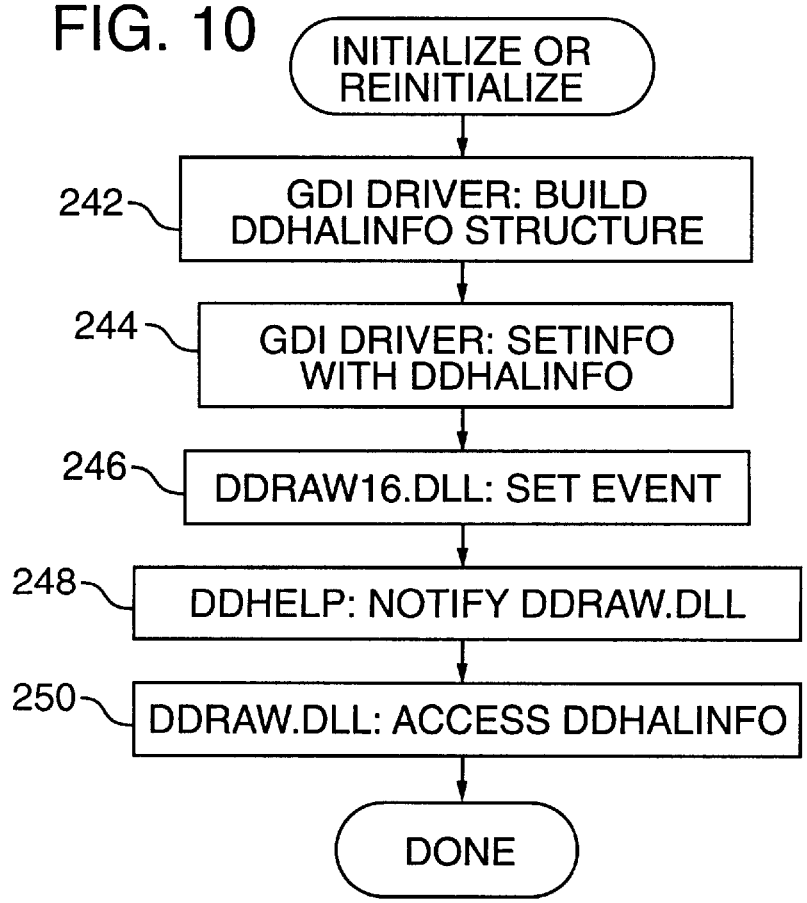
FIG. 10 is a flow chart illustrating the final initialization steps and the steps of updating a display device mode within the system shown in FIG. 8.

With reference to FIG. 10, at step 242, DDCreateDriverObject executes code in the 16-bit driver that retrieves the 32-bit function and driver information from the shared memory and combines it With the 16-bit function and driver information and device specific information to create DDHALInfo. This is the data which is passed to the device interface through a call to SetInfo and includes the main driver callback functions, surface callbacks and palette callbacks, FOURCCs supported, DLL HINSTANCE, pdevice, capabilities supported, rops supported, the required alignments of the scan lines for each kind of memory, the mode table, current video mode, primary surface address, pixel format, video heap info, any 16-bit callback functions (typically only one: HALDestroyDriver).

An example of the data structure of the DDHALInfo follows:

```
typedef struct_DDHALINFO
{
    DWORD                       dwSize;               // size of struct
    LPDDHAL_DDCALLBACKS         lpDDCallbacks;        // direct draw object callbacks
    LPDDHAL_DDSURFACECALLBACKS  lpDDSurfaceCallbacks; // surface object
        callbacks
    LPDDHAL_DDPALETTECALLBACKS  lpDDPaletteCallbacks; // palette object
        callbacks
    VIDMEMINFO                  vmiData;              // video memory info
    DDCAPS                      ddCaps;               // hw specific caps
    DWORD                       dwMonitorFrequency;   // monitor frequency in
        current mode
    DWORD                       hWndListBox;          // list box for debug
        output
    DWORD                       dwModeIndex;          // current mode: index
        into array
    LPDWORD                     lpdwFourCC;           // fourcc codes
        supported
    DWORD                       dwNumModes;           // number of modes
        supported
    LPDDHALMODEINFO             lpModeInfo;           // mode information
    DWORD                       dwFlags;              // create flags
    LPVOID                      lpPDevice;            //physical device ptr
    DWORD                       hInstance;            // instance handle of
        driver
} DDHALINFO;
```

At step 244, the GDI driver calls SetInfo in the DDraw16.dll, passing the DDHALInfo. At step 246, DDraw16.dll triggers an event that a thread in DDHelp is blocked on. A thread, running at priority class REALTIME_PRIORITY_CLASS, has already been created by DDHelp with a thread priority of THREAD_PRIORITY_TIME_CRITICAL. This setting ensures that DDHelp will have the highest priority at the next available time slice after the event is triggered to take control of the processor and allow DDraw.dll to access the updated DDHALInfo. This particular mechanism avoids thunking up from the GDI driver to the DDraw.dll to pass the DDHALInfo.

At step 248, DDHelp calls DDraw.dll to notify it of the availability of the information. At step 250, the information is accessed from DDraw16.dll. Once this step is completed, the application can start or continue processing. The DDraw.dll uses the DDHALInfo as described above to select appropriate function calls to the 32-bit driver or GDI driver. In addition, in the actual embodiment within DirectDraw, the display interface system will use the updated information to notify the application of possible changes to display surfaces or images that might have been affected by the mode change. This is additional functionality that enhances the use of the present invention.

Since the use of threads is relevant to this particular implementation, a brief description of their use follows. In the Windows operating system, every thread has a base priority level determined by the thread's priority value and the priority class of its process. The operating system uses the base priority level of all executable threads to determine which thread gets the next slice of the central processor's time. Threads are scheduled in a round-robin fashion at each priority level, and only when there are no executable threads at a higher level will scheduling of threads at a lower level take place.

In the Windows operating system, two functions, SetPriorityClass and SetThreadPriority are used to establish a thread's priority value and the priority value of its process. The SetPriorityClass function sets the priority class for the specified process. This value together with the priority value of each thread of the process determines each thread's base priority level. The SetPriorityClass function follow:

```
BOOL SetPriorityClass(
    HANDLE hProcess,     // handle to the process
    DWORD fdwPriority    // priority class value
);
```

Parameters
hProcess
    Identifies the process. The handle must have PROCESS_SET_INFORMATION access.
fdwPriority
    Specifies the priority class for the process. Specify one of the following values:
    HIGH_PRIORITY_CLASS: Indicates a process that performs time-critical tasks that must be executed immediately for it to run correctly. The threads of a high-priority class process preempt the threads of normal or idle priority class processes. An example is Windows Task List, which must respond quickly when called by the user, regardless of the load on the operating system. Use extreme care when using the high-priority class, because a high-priority class CPU-bound application can use nearly all available cycles.
    IDLE_PRIORITY_CLASS: Indicates a process whose threads run only when the system is idle and are preempted by the threads of any process running in a higher priority class. An example is a screen saver. The idle-priority class is inherited by child processes.

NORMAL_PRIORITY_CLASS: Indicates a normal process with no special scheduling needs.

REALTIME_PRIORITY_CLASS: Indicates a process that has the highest possible priority. The threads of a real-time priority class process preempt the threads of all other processes, including operating system processes performing important tasks. For example, a real-time process that executes for more than a very brief interval can cause disk caches not to flush or cause the mouse to be unresponsive.

Return Value

If the function succeeds, the return value is TRUE,

If the function fails, the return value is FALSE.

The base priority level of a thread is in the range 1 through 31. The following are the normal base priority levels for each priority class:

HIGH_PRIORITY_CLASS 13

IDLE_PRIORITY_CLASS 4

NORMAL_PRIORITY_CLASS 9 if the window of the process is in the foreground; and 7 if the window is in the background

REALTIME_PRIORITY_CLASS 24

The SetThreadPriority function enables setting the base priority level of a thread relative to the priority class of its process. The initial priority class of a process can be specified in the CreateProcess function. If not specified, the priority class defaults to NORMAL_PRIORITY_CLASS unless the priority class of the creating process is IDLE_PRIORITY_CLASS. In this case, the default priority class of the child process is IDLE_PRIORITY_CLASS. The GetThreadPriority function is used to get the priority value of a thread. The priority class of processes are used to differentiate applications that are time critical and those that have normal or below normal scheduling requirements. Thread priority values are used to differentiate the relative priorities of the tasks of a process. For example, a thread that handles input for a window could have a higher priority level than a thread that performs intensive calculations for the CPU.

The SetThreadPriority follows:

```
BOOL SetThreadPriority(
    HANDLE hThread,      // handle to the thread
    int nPriority        // thread priority level
);
```

Parameters hThread

Identifies the thread. The handle must have THREAD_SET_INFORMATION access.

nPriority

Specifies the priority value for the thread. This parameter can be one of the following values:

Priority Meaning

THREAD_PRIORITY_ABOVE_NORMAL Indicates 1 point above normal priority for the priority class.

THREAD_PRIORITY_BELOW_NORMAL Indicates 1 point below normal priority for the priority class.

THREAD_PRIORITY_HIGHEST Indicates 2 points above normal priority for the priority class.

THREAD_PRIORITY_IDLE Indicates a base priority level of 1 for IDLE_PRIORITY_CLASS, NORMAL_PRIORITY_CLASS, or HIGH_PRIORITY_CLASS processes, and a base priority level of 16 for REALTIME_PRIORITY_CLASS processes.

THREAD_PRIORITY_LOWEST Indicates 2 points below normal priority for the priority class.

THREAD_PRIORITY_NORMAL Indicates normal priority for the priority class.

THREAD_PRIORITY_TIME_CRITICAL Indicates a base priority level of 15 for IDLE_PRIORITY_CLASS, NORMAL_PRIORITY_CLASS, or HIGH_PRIORITY_CLASS processes, and a base priority level of 31 for REALTIME_PRIORITY_CLASS processes.

Return Value

If the function succeeds, the return value is TRUE.

If the function fails, the return value is FALSE.

While details of the present invention have been described herein, it should be apparent that the invention can be modified in arrangement and detail without departing from its principles, accordingly, we claim all modifications that may come within the scope and spirit of the following claims:

We claim:

1. In a system having an integrated driver for a peripheral device in a computer including an N-bit driver implemented in N-bit code and an M-bit driver implemented in M-bit code, and an N-bit interface for allowing application programs to access the peripheral device, a method for updating state information of the integrated driver, where M is less than N, the method comprising:

in response to an initialization request or a mode change, gathering device driver information with the M-bit driver from the M-bit driver and the N-bit driver;

when the device driver information has been gathered, sending a notification from the M-bit code to a real time helper implemented in the N-bit code;

in response to the notification, executing the real time helper to notify the N-bit interface of the update in the device driver information; and accessing the updated device driver information from the N-bit interface.

2. The method of claim 1 wherein N is 32 and M is 16.

3. The method of claim 1 wherein the step of gathering device driver information is performed in response to a mode change of the peripheral device.

4. The method of claim 1 wherein the peripheral device is a display controller and the mode change includes a change in one or more of the following display settings: screen resolution, color format, and monitor refresh rate.

5. A computer readable medium on which is stored executable code including the N-bit driver, the M-bit driver and the N-bit interface, wherein the executable code, when executed by a computer, is operable to perform the method steps of claim 1.

6. The method of claim 2 wherein the peripheral device is a display controller.

7. The method of claim 2 wherein the 32 bit interface provides device independent functions enabling the applications to control the peripheral device either through the 16 bit driver or the 32 bit driver.

8. The method of claim 2 wherein the 16 and 32 bit drivers are loaded into a shared memory space in the computer that is shared between 16 bit and 32 bit processes.

9. The method of claim 6 wherein the device driver information includes 16 bit functions in the 16 bit driver, 32 bit functions in the 32 bit driver, and hardware capabilities of the display driver.

10. In a system having an integrated driver for a peripheral device in a computer including an N-bit driver implemented in N-bit code and an M-bit driver implemented in M-bit code, and an N-bit interface for allowing application programs to access the peripheral device, a method for updating state information of the integrated driver without thunking-up from the M-bit code to the N-bit code, where M is less than N, the method comprising:

in response to an initialization request or a mode change, gathering device driver information with the M-bit driver from the M-bit driver and the N-bit driver;

when the device driver information has been gathered, sending a notification from the M-bit code to a real time helper implemented in the N-bit code, including issuing an event from the M bit code that blocks a high priority thread in the helper and causes the thread to be scheduled to execute in a next available time slice after the event;

in response to the notification, executing the real time helper to notify the N-bit interface of the update in the device driver information; and accessing the updated device driver information from the N-bit interface.

11. In a system having an integrated driver for a peripheral device in a computer including an N-bit driver implemented in N-bit code and an M-bit driver implemented in M-bit code, and an N-bit interface for allowing application programs to access the peripheral device, a method for updating state information of the integrated driver without thunking-up from the M-bit code to the N-bit code, where M is less than N, the method comprising:

in response to an initialization request or a mode change, gathering device driver information with the M-bit driver from the M-bit driver and the N-bit driver;

when the device driver information has been gathered, sending a notification from the M-bit code to a real time helper implemented in the N-bit code;

in response to the notification, executing the real time helper to notify the N-bit interface of the update in the device driver information;

accessing the updated device driver information from the N-bit interface;

receiving function calls from the applications to control the peripheral device in the N-bit interface;

and routing the function calls to either the M-bit driver or the N-bit driver based on the device driver information indicating which functions are supported in the M and N-bit drivers.

12. In a system having an integrated driver for a peripheral device in a computer including an N-bit driver implemented in N-bit code and an M-bit driver implemented in M-bit code, and an N-bit interface for allowing application programs to access the peripheral device, a method for updating state information of the integrated driver without thunking-up from the M-bit code to the N-bit code, where M is less than N, the method comprising:

in response to an initialization request or a mode change, gathering device driver information with the M-bit driver from the M-bit driver and the N-bit driver;

when the device driver information has been gathered, sending a notification from the M-bit code to a real time helper implemented in the N-bit code;

in response to the notification, executing the real time helper to notify the N-bit interface of the update in the device driver information;

accessing the updated device driver information from the N-bit interface;

in response to a query from the N-bit interface to the M-bit driver, providing a name of the N-bit driver, a driver initialization function, and a M-bit pointer to a region in shared memory for M and N-bit processes;

loading the N-bit driver;

executing the driver initialization function to initialize the N-bit driver in the shared memory; and converting the M-bit pointer to a N-bit pointer so that the N-bit driver can access the shared memory.

13. The method of claim 12 wherein the step of gathering device driver information includes writing N-bit driver information to the shared memory using the N-bit pointer to the shared memory.

14. The method of claim 13 wherein the system further includes a M-bit interface to the M-bit driver, wherein the N-bit interface passes an entry point to the M-bit interface to the M-bit driver; and wherein the M-bit driver uses the entry point to pass the device driver information to the M-bit interface.

15. In a system having an integrated driver for a peripheral device in a computer including an N-bit driver implemented in N-bit code and an M-bit driver implemented in M-bit code, a M-bit interface to the M-bit driver and an N-bit interface for allowing application programs to access the peripheral device, a method for updating state information of the integrated driver without thunking-up from the M-bit code to the N-bit code, where M is less than N, the method comprising:

in response to an initialization request or a mode change, gathering device driver information with the M-bit driver from the M-bit driver and the N-bit driver;

when the device driver information has been gathered, sending a notification from the M-bit code to a real time helper implemented in the N-bit code;

in response to the notification, executing the real time helper to notify the N-bit interface of the update in the device driver information;

accessing the updated device driver information from the N-bit interface;

passing an entry point of the M-bit interface to the M-bit driver;

using the entry point to pass the device driver information from the M-bit driver to the M-bit interface;

wherein the step of sending the notification comprises signaling an event from the M-bit interface which indicates new device driver information is available; and when processing switches from M to N-bit processing after the event is scheduled, executing the real time helper to notify the N-bit interface of the update in the device driver information.

16. The method of claim 15 including:

receiving a call from an application in the N-bit interface to control the peripheral device;

examining the device driver information, which includes a list of functions supported in the N-bit driver and in the M-bit driver, to determine whether the call is supported in the N-bit driver, and if so, passing the call directly to the N-bit driver, and if not, passing the call to the M-bit interface, which in turn passes the call to the M-bit driver.

17. In a computer having a processor, memory, and a peripheral device, a system in a computer for integrating M-bit and N-bit device drivers for controlling the peripheral device, the system comprising:

N-bit code including an N-bit device driver;

M-bit code including an M-bit device driver in communication with the N-bit device driver to obtain a N-bit driver information, for combining the N-bit driver information with M-bit driver information to create integrated driver information;

the N bit code further including an N-bit interface for providing an application programming interface to application programs running in the computer that enables the application programs to access the peripheral device; and a notification mechanism in communication with the N-bit interface for notifying the N-bit interface when the integrated driver information changes due to changes in the state of the peripheral device, wherein the notification mechanism is operable to signal an event that is monitored in the N-bit code and reported to the N-bit interface so that the N-bit interface becomes aware that the integrated driver information has been updated.

18. The system of claim 17 wherein N is 32 and M is 16.

19. The system of claim 17 wherein the notification mechanism comprises an event generator in the M-bit code to signal the event and a helper implemented in the N-bit code, which is scheduled and executed in response to the event and which notifies the N-bit interface that the integrated driver information has been updated.

20. In a computer having a processor, memory, and a peripheral device, a system in a computer for integrating M-bit and N-bit device drivers for controlling the peripheral device, the system comprising:

N-bit code including an N-bit device driver;

M-bit code including an M-bit device driver in communication with the N-bit device driver to obtain a N-bit driver information, for combining the N-bit driver information with M-bit driver information to create integrated driver information;

the N bit code further including an N-bit interface for providing an application programming interface to application programs running in the computer that enables the application programs to access the peripheral device; and a notification mechanism in communication with the N-bit interface for notifying the N-bit interface when the integrated driver information changes due to changes in the state of the peripheral device, wherein the notification mechanism is operable to signal an event that is monitored in the N-bit code and reported to the N-bit interface so that the N-bit interface becomes aware that the integrated driver information has been updated;

wherein the integrated driver information includes a list of N-bit functions supported in the N-bit driver and functions supported in the M-bit driver, wherein the N-bit interface is in communication with an application program running in the computer for receiving a function call to access the peripheral device, and in response to the function call, is operable to determine whether the function call is supported in the N-bit driver or the M-bit driver, and is operable to route the function call to the N-bit driver and the M-bit driver.

21. In a computer having a processor, memory, and a peripheral device, a system in a computer for integrating M-bit and N-bit device drivers for controlling the peripheral device, the system comprising:

N-bit code including an N-bit device driver;

M-bit code including an M-bit device driver in communication with the N-bit device driver to obtain a N-bit driver information, for combining the N-bit driver information with M-bit driver information to create integrated driver information;

the N bit code further including an N-bit interface for providing an application programming interface to application programs running in the computer that enables the application programs to access the peripheral device; and a notification mechanism in communication with the N-bit interface for notifying the N-bit interface when the integrated driver information changes due to changes in the state of the peripheral device, wherein the notification mechanism is operable to signal an event that is monitored in the N-bit code and reported to the N-bit interface so that the N-bit interface becomes aware that the integrated driver information has been updated;

wherein the N-bit interface is in communication with the M-bit driver to instruct the M-bit driver to initialize itself in response to a mode change of the peripheral device; and wherein the M-bit driver creates the integrated driver information in response to the mode change.

22. The method of claim 21 wherein the integrated driver information includes a list of capabilities of the peripheral device and a list of functions supported in the M-bit driver and the N-bit driver.

23. The method of claim 22 wherein the peripheral device is a display controller for a display monitor coupled to the computer and the list of capabilities include any one of the following capabilities:

an address of video memory in the display controller;

height of display screen of the monitor;

width of the display screen;

refresh frequency of the monitor;

size of the video memory; and bits per pixel of the display screen.

24. In a system having an integrated driver for a display controller in a computer including an N-bit driver implemented in N-bit code and an M-bit driver implemented in M-bit code, and an N-bit interface for allowing application programs to access the display controller, a method for updating state information of the integrated driver, where M-is less than-N, the method comprising:

in response to an initialization request and a mode change, gathering device driver information with the M-bit driver from the M-bit driver and the N-bit driver, wherein the device driver information includes M bit driver functions supported in the M bit driver, N bit functions supported in the N bit driver, and a list of hardware capabilities of the display controller;

when the device driver information has been gathered, signaling an event from the M-bit code to a real time helper implemented in the N-bit code;

in response to the event, executing the real time helper to notify the N-bit interface of the update in the device driver information;

accessing the updated device driver information from the N-bit interface;

receiving a call from an application in the N-bit interface to access the display controller; and examining the device driver information to determine whether the call is supported in the N-bit driver, and if so, passing the call directly to the N-bit driver, and if not, routing the call to the M-bit driver.

* * * * *